Sept. 8, 1936.   L. K. SILLCOX   2,053,500
FLUID PRESSURE BRAKE
Filed July 10, 1935   2 Sheets-Sheet 1
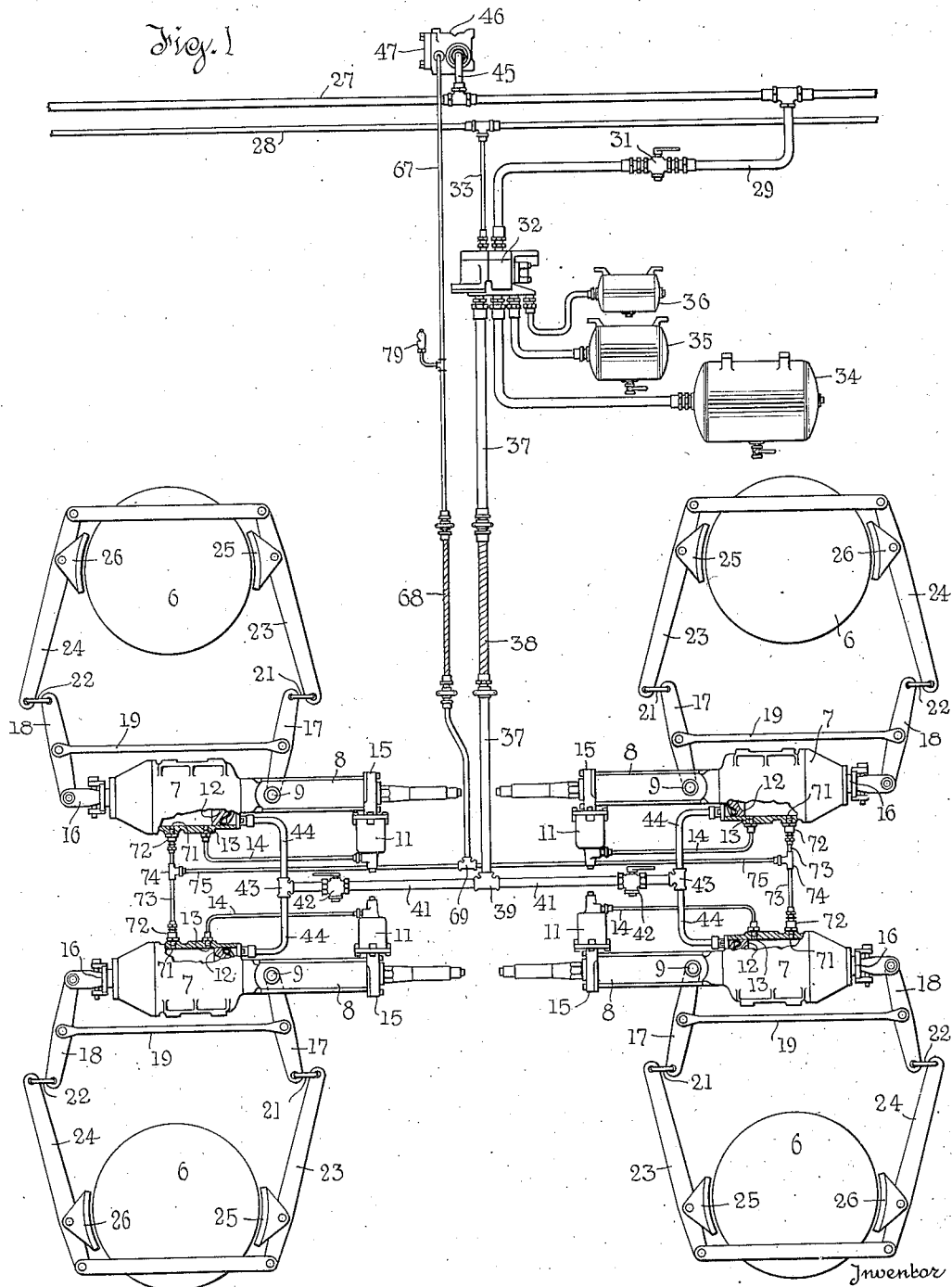
Inventor
Lewis K. Sillcox
By
Attorneys Sept. 8, 1936.    L. K. SILLCOX    2,053,500
FLUID PRESSURE BRAKE
Filed July 10, 1935    2 Sheets-Sheet 2
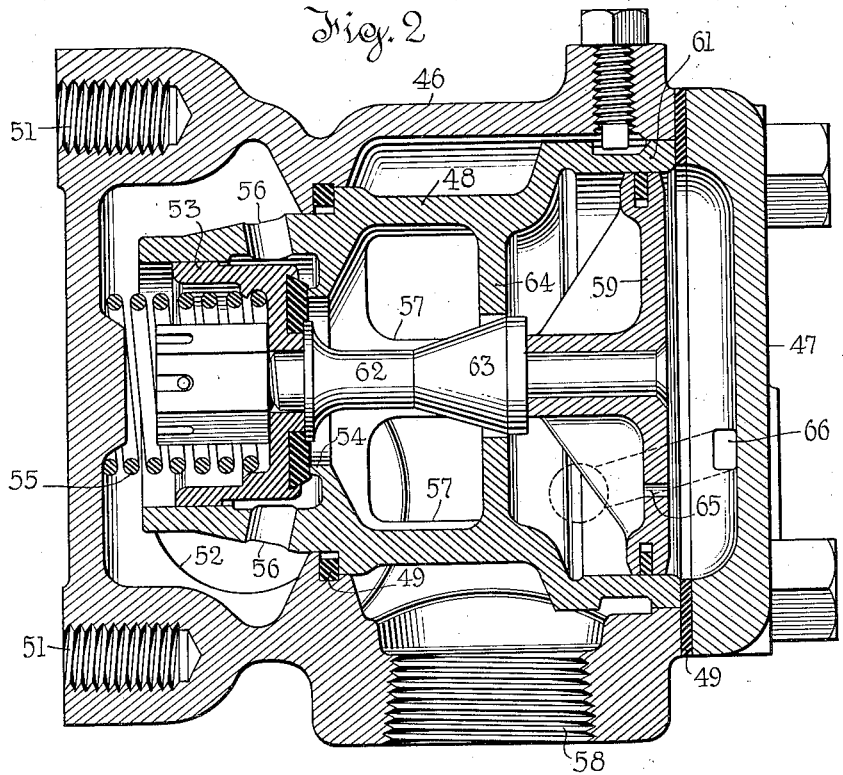
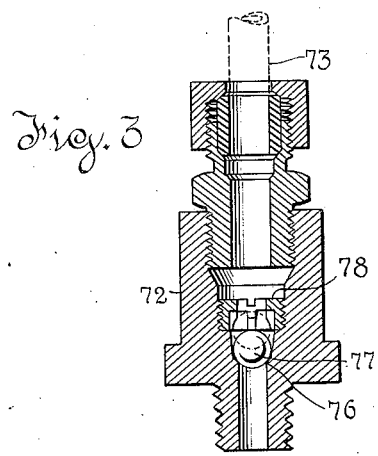
Inventor
Lewis K. Sillcox
Attorneys Patented Sept. 8, 1936

2,053,500

UNITED STATES PATENT OFFICE 2,053,500

FLUID PRESSURE BRAKE

Lewis K. Sillcox, Watertown, N. Y., assignor to The New York Air Brake Company, a corporation of New Jersey Application July 10, 1935, Serial No. 30,714

11 Claims. (Cl. 303—81)

This invention relates to fluid pressure brakes and particularly to means for insuring a safe limit on piston travel in brake cylinders.

While generally applicable to railway trains the invention was designed to meet conditions encountered with high speed articulated trains. In such trains the practice is to use four wheel trucks and these trucks are located under the hinge connections between the cars, so that for a given train the average number of wheels per car is slightly in excess of four. This imposes limits on possible brake shoe area, requiring rather high maximum unit braking pressures.

In order to provide smooth riding qualities with four wheel trucks it is desirable to use a rather complex link suspension and spring structure, which limits the available space between the side frames, and for this reason, as well as to secure ready accessibility, it has been proposed to locate the brake cylinders outside the side frames of the trucks, preferably individual cylinders for the clasp brakes embracing each wheel. This arrangement would be unsafe if used in such a way that the brakes might fail to apply on one wheel of a pair.

To preclude such possibility, the present invention provides means to give positive indication of excessive piston travel (less than the full stroke) in any brake cylinder. The most certain way of calling attention to the excessive travel is to cause such excessive travel to apply the brakes and maintain them applied throughout the train, whenever excessive travel occurs in any cylinder. This will require rectification of the faulty condition or the cutting out of both cylinders of any pair in which either cylinder has excessive travel, before the brakes can be released to permit the train to proceed. A whistle or other audible signal may be used to indicate the truck which caused the brakes to apply.

Generally stated, the invention contemplates the actuation of an emergency application valve (conveniently a pressure motor actuated valve which vents the brake pipe) by air bled from any brake cylinder whose piston travels far enough to expose a port connected with the actuating mechanism of the vent valve.

Such brake pipe might be the brake pipe of an automatic air brake system, but the invention will be described with reference to the two pipe straight air system commonly used on modern high speed trains.

Generally stated, such systems include a normally charged brake pipe (sometimes called a supervisory line) and a straight air pipe (sometimes called a control line). Venting of the brake pipe (supervisory line) causes a continuous application of the brakes in such systems, through means well understood in the art. The exact mechanism used as a part of the brake system to produce the application is immaterial to the present invention, and is subject to considerable variation. The important point is that, in almost any commercial system, venting of a pipe commonly called the brake pipe will produce a brake application. This fact is availed of in the present invention.

In the illustrated embodiment a single vent valve responds to excess travel in any cylinder on the corresponding truck. Means are provided to prevent air flow between cylinders through the valve actuating connections.

The preferred embodiment of the invention, applied to the class of service above mentioned, will now be described, reference being made to the accompanying drawings, in which,—

Fig. 1 is a diagrammatic view, showing the brake pipe and straight air pipe, and the connected application and release valve, reservoirs, brake cylinders and clasp brake lever mechanisms for one four-wheeled truck. The wheels and lever mechanisms are developed into a common plane to permit illustration of the levers in a single view.

Fig. 2 is an axial section through the vent valve.

Fig. 3 is an axial section through the check valve fitting used on each brake cylinder.

The four wheels of a truck are indicated at 6 and the four brake cylinders corresponding thereto at 7. The wheels are arranged in pairs. On the head of each cylinder 7 is the guide 8 for the adjustable fulcrum 9 of the pneumatic slack adjuster. These slack adjusters are identical and of a type standard for the past twenty-five years and hence require only a very general description. A small piston in cylinder 11 is shifted against spring resistance whenever piston 12 in cylinder 7 overtravels port 13 in cylinder 7, port 13 being connected by pipe 14 with cylinder 11. When the brakes are released the piston in cylinder 11 is returned by the spring mentioned, and through a ratchet in housing 15 turns a nut and thus moves a threaded stem in which fulcrum 9 is mounted. Thus whenever brake piston 12 overtravels port 13 the fulcrum 9 is shifted outward to reduce the slack (see Patent No. 1,422,499 of July 11, 1922) and piston travel is thus normally limited.

The piston 12 operates push rod 16. A lever 17 is hinged at one end to fulcrum 9, and a similar lever 18 is pinned at one end to push rod 16. A link 19 is pivoted to the mid-point of each lever 17 and 18, whose free ends are connected by links 21, 22 to the brake shoe levers 23 and 24. Levers 23 and 24 carry brake shoes 25 and 26 forming a clasp brake.

Each wheel has an individual brake cylinder, slack adjuster and clasp brake mechanism, as shown, and all four cylinders are controlled in unison by a single application valve.

The brake pipe (supervisory line) is shown at 27 and the straight air pipe (control line) at 28. Brake pipe 27 is connected by branch 29, through normally open cut-out cock 31 with the application and release valve 32. The straight air pipe 28 is connected with valve 32 by branch 33.

The application and release valve 32 may conform to a standard schedule known as H. S. C., includes a relay portion and a triple valve portion, and is connected with a local reservoir 34 which is charged from brake pipe 27 and furnishes air for applications. The auxiliary reservoir 35 and reduction reservoir 36 function in conjunction with the triple valve portion of the application and release valve 32 to apply the brakes if the brake pipe 27 be vented. The relay portion operates under control of pressure in the straight air pipe. No novelty is here claimed for valve 32 and various approximate equivalents are well known.

Valve 32 is connected by pipe 37 (having a suitably located flexible portion 38, to permit motion of the truck relatively to the cars) with a T 39. Two branches 41 lead from T 39 through cutout cocks 42 to T's 43 from which branches 44 lead to the cylinders 7.

The construction so far described follows known practice except in the provision of a brake cylinder for each wheel instead of for each pair of wheels.

Connected with brake pipe 27 by branch 45 is a vent valve indicated in Fig. 1 by the numeral 46 applied to its body. This valve will now be described with reference to Fig. 2. In this figure the valve is reversed right to left with respect to Fig. 1.

A cap 47 bolted to body 46 holds a valve cage and cylinder bushing 48 in place and seals it by means of gaskets 49. Tapped holes 51 are to receive mounting screws (not shown). Branch pipe 45 connects to port 52, so that brake pipe pressure urges the poppet type vent valve 53 toward its seat 54 as does spring 55. Valve 53 is normally closed but when forced from its seat the brake pipe 27 is vented via branch 45, port 52, passages 56 and 57 in cage 48, and exhaust passage 58.

To unseat valve 53 a piston 59 is provided. This works in cylinder bushing 61 and is connected by stem 62 with valve 53. An enlargement 63 on stem 62 acts in conjunction with a ported baffle 64 to protect the piston 59 from the blast of discharging air. The piston 59 has a small vent port 65 and the pressure fluid (air) to actuate the piston is admitted through a port 66 which leads through body 46 and cap 47 from a small pipe 67 (see Fig. 1).

Pipe 67 includes a flexible portion 68 to permit swiveling motion of the truck and leads from a T 69 to which air under pressure flows from any cylinder whose piston overtravels.

Each cylinder 7 has a port 71 which is overtraveled by corresponding piston 12 at a safe limit of travel, less than the full stroke of the piston. Each port 71 leads through a check valve body 72 (see Fig. 3) to a pipe 73. The pipes 73 are connected through T's 74, branches 75 and T 69 with pipe 67. Body 72 has a seat 76 for an outwardly opening ball check valve 77 retained by cage 78.

A small whistle 79 may be connected to pipe 67 to indicate the truck on which excessive piston travel has caused application of the brakes.

The device operates as follows:

Normally the slack adjusters operate to hold piston travel to the normal value. At the limit of adjustment of fulcrum 9 the corresponding slack adjuster ceases to operate. If wear is permitted to continue beyond this point, the slack and piston travel gradually increase until a piston 12 overtravels its port 71. This allows brake cylinder air to flow past check valve 77 to pipe 67 to shift piston 59 and vent brake pipe 27. This produces an emergency application which cannot be released so long as pipe 27 is vented. The continuous blowing of whistle 79 makes it possible to locate that truck which caused the emergency application, and identification of the brake cylinder is then easy. When this is done this and the companion cylinder are cut out by closing the appropriate cock 42 and new brake shoes are fitted. It is important that provision be made to cut the cylinders out in pairs and not singly.

As soon as the cylinder whose piston overtraveled is cut out, the supply of pressure fluid to piston 59 ceases and vent 65 dissipates the pressure so that valve 53 closes. The brakes may then be released.

The function of check valves 77 is to prevent loss of pressure fluid through the ports 71 of those cylinders in which overtravel does not occur.

Practically all the components combined according to the present invention have been used individually in the art for other purposes. Other selections could be made to produce the novel combination here disclosed or its equivalent, so that limitation to the specific form of the components is not implied. On the contrary the disclosure is intended to be illustrative and not limiting.

What is claimed is,—

1. A fluid pressure brake system comprising in combination, a brake pipe; brake cylinders having pistons; brake applying valve devices interposed between the brake pipe and corresponding brake cylinders; and means operatively related with a part moving with at least one piston at a point beyond the normal travel thereof, operating upon the brake pipe and put into action by excessive piston travel to produce an emergency application.

2. A fluid pressure brake system comprising in combination, a brake pipe; brake cylinders having pistons; brake applying valve devices interposed between the brake pipe and corresponding brake cylinders; and means operatively related with a part moving with at least one piston at a point beyond the normal travel thereof, operating upon the brake pipe and put into action by excessive piston travel to produce and continuously maintain an emergency application.

3. A fluid pressure brake system comprising in combination a normally charged brake pipe; brake cylinders having pistons; brake applying valve devices interposed between the brake pipe and corresponding brake cylinders, said devices responding to venting of the brake pipe to produce an emergency application; and means operatively related with a part moving with a piston at a point beyond the normal travel thereof, and responsive to excessive piston travel for venting the brake pipe.

4. A fluid pressure brake system comprising in combination a normally charged brake pipe; brake cylinders having pistons; brake applying valve devices interposed between the brake pipe and corresponding brake cylinders, said devices responding to venting of the brake pipe to produce an emergency application; at least one fluid pressure operable brake pipe vent valve; and means comprising a pressure transmitting connection from a brake cylinder to the operating portion of said vent valve, said connection being exposed to brake cylinder pressure upon the occurrence of excessive piston travel.

5. A fluid pressure brake system comprising in combination a brake pipe; a plurality of wheels arranged in pairs; braking mechanisms each including a cylinder and piston, one such mechanism for each wheel; a brake applying valve device interposed between the brake pipe and a group of brake cylinders comprising at least one pair; and means operating upon the brake pipe, and put into action by excessive piston travel in any cylinder of the group to produce an emergency application.

6. A fluid pressure brake system comprising in combination a brake pipe; a plurality of wheels arranged in pairs; braking mechanisms each including a cylinder and piston, one such mechanism for each wheel; a brake applying valve device interposed between the brake pipe and a group of brake cylinders comprising at least one pair; and means operating upon the brake pipe, and put into action by excessive piston travel in any cylinder of the group to produce and continuously maintain an emergency application.

7. A fluid pressure brake system comprising in combination a brake pipe; plurality of wheels arranged in pairs; braking mechanisms each including a cylinder and piston, one such mechanism for each wheel; a brake applying valve device interposed between the brake pipe and a group of brake cylinders comprising at least one pair; means operating upon the brake pipe, and put into action by excessive piston travel in any cylinder of the group to produce an emergency application; and means to cut out said brake cylinders in pairs.

8. A fluid pressure brake system comprising in combination a normally charged brake pipe; a plurality of wheels arranged in pairs; braking mechanisms each including a cylinder and piston, one such mechanism for each wheel; a brake applying valve device interposed between the brake pipe and a group of cylinders comprising at least one pair, said valve device responding to venting of the brake pipe to produce an emergency application; and means responsive to excessive piston travel in any cylinder of the group to vent the brake pipe.

9. A fluid pressure brake system comprising in combination a normally charged brake pipe; a plurality of wheels arranged in pairs; braking mechanisms each including a cylinder and piston, one such mechanism for each wheel; a brake applying valve device interposed between the brake pipe and a group of cylinders comprising at least one pair, said valve device responding to venting of the brake pipe to produce an emergency application; means responsive to excessive piston travel in any cylinder of the group to vent the brake pipe; and means for cutting out cylinders in pairs.

10. A fluid pressure brake system comprising in combination a normally charged brake pipe; a plurality of wheels arranged in pairs; braking mechanisms each including a cylinder and piston, one such mechanism for each wheel; a brake applying valve device interposed between the brake pipe and a group of cylinders comprising at least one pair, said valve device responding to venting of the brake pipe to produce an emergency application; a pressure operable brake pipe vent valve; and a connection from the brake cylinders of the group to the operating means of said vent valve, said connection being subjected to brake cylinder pressure by excessive piston travel in any cylinder of the group.

11. A fluid pressure brake system comprising in combination a normally charged brake pipe; a plurality of wheels arranged in pairs; braking mechanisms each including a cylinder and piston, one such mechanism for each wheel; a brake applying valve device interposed between the brake pipe and a group of cylinders comprising at least one pair, said valve device responding to venting of the brake pipe to produce an emergency application; a pressure operable brake pipe vent valve; a connection from the brake cylinders of the group to the operating means of said vent valve, said connection being subjected to brake cylinder pressure by excessive piston travel in any cylinder of the group; and means precluding flow from said connection to the various cylinders.

LEWIS K. SILLCOX.